United States Patent [19]

Pusch

[11] 4,102,840

[45] Jul. 25, 1978

[54] PROCESS FOR THE MANUFACTURE OF UREA-HCHO-ISOBUTYRALDEHYDE CONDESNATION PRODUCTS AND COMPOSITIONS THEREOF

[75] Inventor: Günter Pusch, Leitershofen, Germany

[73] Assignee: Ciba-Geigy Corporation, Ardsley, N.Y.

[21] Appl. No.: 741,912

[22] Filed: Nov. 15, 1976

[30] Foreign Application Priority Data

Sep. 3, 1976 [DE]   Fed. Rep. of Germany ....... 2639754

[51] Int. Cl.$^2$ ...................... C08G 12/42; C08L 61/24
[52] U.S. Cl. .................................. 260/29.4 R; 8/186;
   260/849; 528/259; 528/261
[58] Field of Search ..................... 260/68, 70 A, 70 R,
   260/29.4 R; 8/186

[56] References Cited

U.S. PATENT DOCUMENTS

3,518,043   6/1970   Petersen et al. ...................... 8/116.3

FOREIGN PATENT DOCUMENTS

| 1,810,925 | 8/1970 | Fed. Rep. of Germany. |
| 2,455,420 | 5/1976 | Fed. Rep. of Germany. |
| 2,259,680 | 7/1974 | Fed. Rep. of Germany. |
| 1,069,526 | 5/1967 | United Kingdom. |

*Primary Examiner*—Howard E. Schain
*Attorney, Agent, or Firm*—Edward McC. Roberts; Prabodh I. Almaula

[57] ABSTRACT

This invention describes a process for the manufacture of condensation products and compositions obtained thereby. The condensation products are prepared by the reaction of 2 to 3 moles of urea with 0,9 to 1,1 mole of formaldehyde and 1 mole of isobutyraldehyde in the presence of 0,2 to 1,0 equivalent of strong acids and 4 to 18 moles of water. The pH-value of the resulting products is adjusted to 7 to 9,5 and the water is partially to almost completely removed. Then the products are methylolated with 3 to 4 moles of formaldehyde. Finally the condensation products are etherified with low alcohols in usual manner. Used singly or together with other N-methylol compounds and their ethers with low alcohols, the products are useful compositions which are capable of rendering cellulosic textile materials and blends with synthetic fibres crease- and shrinkproof.

11 Claims, No Drawings

PROCESS FOR THE MANUFACTURE OF UREA-HCHO-ISOBUTYRALDEHYDE CONDESNATION PRODUCTS AND COMPOSITIONS THEREOF

This invention relates to a process for the manufacture of condensation products and compositions thereof. Depending on the employed molar ratios and reaction conditions, the reaction of urea with CH-acidic aldehydes yields pyrimidone derivatives or linear polyalkyliden ureas from which, in strongly acid medium, cyclic compounds are also formed (H. Petersen; Agnew. Chemie 76 (1964), pages 909 – 919).

Methylolated pyrimidone derivatives, which are optionally etherified with lower alcohols and which are obtained from urea and certain aldehydes in a molar ratio of 1 : 2, have already become known as finishing agents for textiles (US-PS 3 518 043).

It has now been found that condensation products useful as textile finishing agents with especially favourable properties are obtained by reacting urea, isobutyraldehyde and formaldehyde in a molar ratio of 2 to 3 : 1 : 0,9 to 1,1 in the presence of strong acids and water under certain conditions and subsequently methylolating the resulting products with formaldehyde in known manner and then effecting almost complete etherification with low molecular alcohols.

The process according to the invention for the manufacture of curable condensation products from urea, formaldehyde and CH-acidic aldehydes under acid conditions, subsequent reaction with additional formaldehyde under neutral or alkaline conditions and etherification with low alcohols under acid conditions, comprises reacting at 50° to 90° C 2 to 3 moles of urea with 0.9 to 1.1 mole of formaldehyde and 1 mole of isobutyraldehyde in the presence of 0.2 to 1.0 especially 0.35 to 0.65 equivalent of strong acids and 4 to 18, especially 8 to 16, moles of water, methylolating with 3 to 4 moles of formaldehyde after having adjusted the pH -value to 7 to 9.5 and, after partial to almost complete removal of the water, subsequently etherifying in the usual manner the resulting condensation products containing N-methylol groups with alcohols with 1 to 3 C-atoms, and finally finishing in the usual way.

It is advantageous to remove the bulk of the lower alcohol generally used in the final etherification in excess by distillation subsequent to the neutralisation which is usually carried out.

The so obtained condensation products represent liquid products of solid content of 50 to 85% by weight, stable to storage, which are highly suitable as finishing agents for textile materials, which at least partially contain cellulose fibres. They give very good crease and shrinkproof resistance as well as "wash-and-wear"-effects. Therefore, there is furthermore claimed a composition which is capable of rendering textile materials containing at least partially cellulosic fibres, crease- and shrinkproof, said composition containing 50 to 85% by weight of condensation product (calculated as solids), manufactured according to the process of this invention, and the balance up to 100% by weight consisting of water and water soluble solvents. Furthermore it is advantageous to replace partially said condensation products, namely up to 65% by weight, particularly from 25 to 55% by weight (calculated as solids), by other N-methylol compounds and their ethers, which are conventionally used as creaseproofing agents for textiles.

Compared with products manufactured according to the known process mentioned at the outset, the condensation products obtained by the process of the invention are characterised by a better maintenance of the degree of whiteness of the finished textile material. Special attention should also be drawn to the insignificant splitting off of formaldehyde during the finishing process and especially also when storing the completed textile material. Precisely in this respect the new reaction products offer special advantages with regard to the increasingly stringent requirements concerning free formaldehyde on the fabric. Moreover, special mention must be made of the fact that the condensation products manufactured according to the invention can also be cured with curing catalysts based on ammonium salts without the danger of fish odour occurring. Therefore, it is not necessary to wash textile material finished in this way — as is usual according to the indicated prior art — after treatment with aminoplasts and ammonium salts as curing catalysts. Finally it must be stressed that the new condensation products impart to the treated textile material an especially soft and smooth handle.

Generally, the manufacture of the condensation products is effected by dissolving 2 to 3 moles of urea in at least 4, preferably 8 to 16, moles of water and 0.9 to 1.1 mole of formaldehyde, by adding 1 mole of isobutyraldehyde and 0.2 to 1.0, especially 0.35 to 0.65, equivalent of strong acids, and by reacting at 50° to 90° C, especially 65° to 80° C, while stirring. It is, however, also possible, and indeed preferred, to react the urea, water and formaldehyde beforehand and only then to add the further starting compounds. On the other hand, however, the sequence is not rigid, i.e. for example the isobutyraldehyde can be easily added prior to formaldehyde. This first reaction step is generally complete after about 10 to 60 minutes. Then neutralisation is performed with alkaline-acting compounds and the water removed partially to almost completely e.g. by distillation. The water is removed to such an extent that it will no longer interfere to any great extent with the subsequent methylolation and above all with the etherification step. After optionally adding further alkaline-acting compounds, so that a pH-value of 7 to 9.5 results, 3 to 4 moles of formaldehyde are added, preferably in the form of paraformaldehyde. It is advantageous to carry out the reaction in this case, too, at temperatures of about 50° to 90° C (duration of the methylolation 15 to 60 minutes). The etherification of the resulting N-methylol compounds with lower alcohols containing 1 to 3 C-atoms is effected in the usual way in acid medium. In doing so, it is advantageous to use an excess of lower alcohols. The unreacted alcohols are removed preferably in known manner after repeated neutralization. The starting compounds are used in technical quality.

For the acidification in the first reaction step strong acids are used, especially inorganic acids, such as phosporic acid and specially preferred sulphuric acid and hydrochloric acid. But organic acids, such as maleic acid and oxalic acid, are also suitable.

The molar ratio of urea to formaldehyde is isobutyraldehyde is of critical importance. It is 2 to 3 : 0.9 to 1.1 : 1. In addition, the ratio of urea to strong acid to water is important. According to the invention, at least 4, especially 8 to 16, moles of water and 0.2 to 1, especially 0.35 to 0.65 equivalent of strong acid are used per 2 to 3 moles of urea. The upper limit for the amount of water is not critical (amount of water also includes the quantity of water introduced by aqueous formaldehyde solution and, if necessary, by the strong acid); but for economic reasons it is generally about 18 moles. Under these conditions practically exclusively non-cyclic compounds having the advantageous properties already mentioned above, are obtained. For the subsequent neutralisation and adjustment to a pH-value of 7 to 9.5 alkaline-acting compounds, such as alkali hydroxides, especially sodium or potassium hydroxide, are used. But sodium carbonate and potassium carbonate are also suitable. It is also possible to carry out the rough adjustment of the pH-value with the cited alkaline-acting compounds and for the fine adjustment to use amines, especially tertiary amines, such as triethanolamine.

For the methylolation, formaldehyde - contrary to the first process step - is preferably employed as almost anhydrous paraformaldehyde, since the presence of an unnecessarily large amount of water would have a deleterious effect on the degree of etherification in the subsequent etherification step. For the subsequent etherification in acid medium, monovalent aliphatic alcohols with 1 to 3 C-atoms, such as ethanol, isopropanol, but especially methanol, are suitable.

The resulting products are water-clear liquids with a solid content of 50 to 85% by weight and are stable to storage. It is surprising that, in spite of the high proportion of formaldehyde, they split off remarkably little formaldehyde during the treatment of textile materials. Moreover, only an insignificant amount of formaldehyde splits off on the finished textile material.

The treatment of the textile material is effected by known methods. The textiles are preferably impregnated with the aqueous solutions of the condensation products manufactured according to the invention which additionally contain the known curing catalysts, squeezed out, dried, and heated for a few minutes to temperatures of 130° to 160° C. A shock-condensation for 10 to 90 seconds at temperatures up to 190° C is also possible. The concentration of the impregnating liquid depends on the textile material to be treated and the required finishing effects and amounts to 2 to 10% by weight, referred to anhydrous condensation product. It will be readily understood that the impregnating liquid can also be applied to textile material by other methods, such as slop-padding, spraying and the like, usually the concentration of the finishing agent being adjusted corresponding to the wet pick-up. If special circumstances make it necessary, the hardening catalyst may also be applied separately, i.e. separated from the impregnating liquid, e.g. not until after-drying.

Suitable curing catalysts are the customary compounds with acid action at elevated temperature or by hydrolisis. By such compounds are meant in particular salts of strong acids with weak bases, such as ammonium and amine salts of hydrochloric, phosphoric and sulphuric acid, and the magnesium, zinc, aluminium salts of hydrochloric, nitric and perchloric acid. Moreover, mixtures of the cited compounds can be used with each other. The cited compounds and their mixtures can still be assisted in their effect by adding small amounts of organic acids or fluoroborates, such as zinc or alkali fluoroborate. It is to be particularly pointed out that the new condensation products produced according to the invention can be cured with ammonium or amine salts without any trace of the odours which usually occur when using these compounds. When using the cyclic compounds of the prior art, there is the danger of the formation of fish odour during the condensation with ammonium or amine salts so that for safety's sake a washing-off is necessary. Surprisingly, no tendency for the products produced and used according to the invention to develop a fish odour is observed, so that the washing process can dispensed with.

The new condensation products obtained according to the invention are preferably replaced up to 65% by weight, especially between 25 and 55% by weight, by other N-methylol compounds or their ethers with lower alcohols (1 to 3 C-atoms) employed in textile finishing. Mention may be made for example of the precondensates based on urea and its cyclic derivatives, such as ethylene and propylene urea, of urone and triazone, and especially of dihydroxy ethylene urea as well as of melamine. When using the two last mentioned precondensates, the maintenance of the degree of whiteness is quite particularly noticeable. Moreover, the usual water-repellent, softening, flameproofing, crosslinking and wetting agents can additionally be used in the finishing baths. It is, of course, also possible to use in addition synthetic latex dispersions.

The treated textile material, preferably fabrics, consist at least partially of natural cellulose fibres or regenerated cellulose fibres. Besides the pure cellulose textiles, also blended textiles from cellulose fibres and synthetic fibres, especially polyester, polyamide and polyacrylonitrile fibres are finished, in which case the synthetic content may be entirely predominant.

EXAMPLE 1

Into a 2 liter three-necked flask equipped with stirrer, drip funnel and distillation apparatus were charged 100 g — of a 30% aqueous formaldehyde solution (1 mole), adjusted with triethanaolamine to a pH-value of 7,5 and 126 g — of urea (2,1 mole) and 150 cm$^3$ — of water.

After stirring for 1 hour at 20° C 72 g — of isobutyraldehyde (1 mole) are admixed and 50 cm$^3$ — of concentrated hydrochloric acid (1/2 equivalent) are added in the course of about 1 minute. The temperature quickly increases to 70° to 75° C. After 18 minutes at this temperature the batch, which is practically clear, is brought to a pH-value of 8,5 with a 50% aqueous solution of sodium hydroxide. Then 210 cm$^3$ water are distilled off under normal pressure and then 105 g — of paraformaldehyde (3,5 moles) are added. Methylolation is effected for 30 minutes at a pH-value of 8,0 and 80° C. The reaction mixture is cooled to 55° C and then 350 g — of methanol and 15 cm$^3$ — of concentrated hydrochloric acid are added.

After etherification for 20 minutes at 55° to 60° C the solution is adjusted with the above sodium hydroxide solution to a pH -value of 8.0. Subsequently 270 g — of water-containing methanol are distilled off under normal pressure.

A clear, practically colourless, oily liquid product with a solids content of about 70% is obtained, which has a storage life of more than 1 year.

A finishing test on a white, bleached cotton-polyester 50 : 50-shirting poplin (98 g/m$^2$) is carried out with this product by applying an aqueous bath consisting of 7.0% by weight of the above liquid product 2.0% by weight of a 40% non-ionic polyethylene emulsion 0.3% by weight of ammonium chloride and 0,4% by weight of an optical brightener of the following formula (in commercial form)

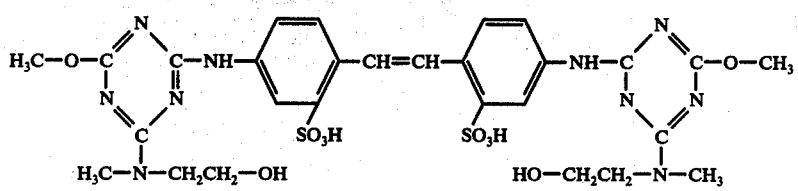

by immersion and squeezing on the padder (liquor pick-up 63%, referred to the dry weight of the material). Subsequently the material is dried at 100° C and condensed for 5 minutes at 145° C.

The finished fabric sample has the following technological properties:

| | |
|---|---|
| Dry crease angle according to DIN 53890 (sum from warp and weft) | 270° |
| Wet crease angle according to Gutezeichenverband Textilveredlung e.V., Frankfurt, BRD (GuTV) (sum from warp and weft) | 266° |
| Monsanto wash-and-wear-effect after 5 × 60° C machine washes | 4,2 |
| Accellerotor-abrasion loss (3 minutes at 3.000 revolutions/minute) | 9% |

The amount of free formaldehyde determined on the nonrinsed fabric was 380 ppm according to the acetylacetone method of Japanese Law 112-1973.

The handle of the treated material is pleasantly soft and smooth, the degree of whiteness very good.

The intensified smell test by spraying with 1% aqueous sodium bicarbonate solution shows that there is no tendency to develop a fish odour.

EXAMPLE 2

The product according to example 1 is mixed with the same quantity of a 70% aqueous 1,3-dimethyloldihydroxy ethylene urea solution to give a finishing agent.

A finishing test is carried out with this mixed product on a white, bleached, optically pre-brightened cotton batiste (92 g/m²), by applying an aqueous solution consisting of 9% — by weight of the above mixed product (about 70% by weight)

2% — by weight of a 25% finely dispersed, non-ionic emulsion of stearic acid amide, 0.1% — by weight of 60% acetic acid, 1.5% — by weight of zinc nitrate hexahydrate, 0.2% — by weight of the optical brightener mentioned in example 1 and 2% — by weight of a 30% non-ionic, aqueous polyacrylic acid butyl ester emulsion by immersion and squeezing on the padder (liquor pick-up 70%). Subsequently the material is dried at 100° C and subjected to a heat treatment at 155° C for 5 minutes.

The finished fabric has the following effects:

| | |
|---|---|
| Dry crease angle according to DIN 53890 (sum from warp and weft) | 223° |
| Wet crease angle according to GUTV (sum from warp and weft) | 234° |
| Monsanto wash-and-wear-effect after 5 × 60° C washes | 4 |

Moreover, the finished sample has a good degree of whiteness, i.e. it was not impaired by the finish. Furthermore, a soft, pleasant handle is observed. By finishing in the same way a fabric which is dyed with sensitive dyes (naturally without optical brightener), the lightfastness of the treated material is not impaired, i.e. the mixed product has the same advantageous properties as otherwise only the finish with pure dimethylol dihydroxy ethylene urea exhibits.

EXAMPLE 3

Into a V4A-steel stirring vessel with steam heating and water cooling, equipped with vacuum distillation apparatus, are charged 1.130 kg of an aqueous 25% formaline solution (adjusted with sodium carbonate to pH 7.8) and 1.500 kg of urea. Directly afterwards 720 kg of isobutyraldehyde and 400 kg of 50% sulphuric acid are added. The mixture is kept for 30 minutes at 76° C while stirring and then the batch, which is in the meantime clear and liquid, is adjusted with 45% of potassium hydroxide to a pH-value of 9.0. Then 650 l water are distilled off under reduced pressure, and 3 kg of triethanolamine and 1.100 — kg of paraformaldehyde are added.

Methylolation is carried out at a pH-value of 8.0° and 72° C for 40 minutes. The reaction mixture is cooled to 60° C and then 4.000 l of water-containing methanol (density at 20° C = 0,83) and 120 l of concentrated hydrochloric acid (31%) are added.

After 15 minutes at 62° C the etherification is complete and the pH is then adjusted with potassium hydroxide to a pH-value of 8.5 and subsequently 3400 l of a methanol/water mixture are distilled off under vacuum. A practically clear, colourless, liquid product with a dry content of about 68% is obtained, which is stable to storage for more than 1 year. When using the reaction product manufactured as described above, a textile finishing agent of good universal applicability can be obtained by mixing:

30% by weight of the product manufactured as described above,

15% by weight of water

40% by weight of a 45% aqueous solution of dimethylol dihydroxyethylene urea and 15% by weight of a 75% hexamethylol melamine pentamethyl ether in water.

In accordance with the particulars of example 2, a mixed fabric of rayon staple fibre/polyester 70/30 (250 g/m²) is finished with this mixture. The finished fabric shows good crease and shrinkproof resistance and a soft handle.

EXAMPLE 4

A product is manufactured in accordance with example 1, with the difference that, in the first step, 1.06 mole of formaldehyde is used instead of 1 mole, 0.7 equivalent of hydrochloric acid is used instead of 0.5 equivalent and, for the methylolation, 3.3 moles of paraformaldehyde are used instead of 3.5 moles and, furthermore, that the same molar quantity of ethanol instead of methanol is used for the etherification of the methylol compound. A cotton polyamide blended batiste 80/20 (90 g/m$^2$) is finished with this product as follows:

The fabric is padded with an aqueous bath containing
- 50 — g/l of the product solution manufactured as described,
- 3,5 — g/l ammonium nitrate and
- 2 — g/l of a wetting agent based on dodecylbenzene sulphonate and dodecyl alcohol, ethoxylated with 7 ethylene oxyde units, then squeezed out to a liquor pick up of 60%, dried at 110° C and subjected to a heat treatment for 4 minutes at 150° C.

The treated fabric shows the advantageous properties described in example 1.

EXAMPLE 5

According to example 3, two further etherified N-methylol resins are produced with the difference that, instead of the sulphuric acid used in example 3, phosphoric acid is used for the one resin and maleic acid for the other (0.8 equivalent each per mole isobutyraldehyde).

Both products do not become quite clear in the first step. Moreover, the potassium phosphate and potassium maleinate formed results in a certain buffering which, in the later etherification as well as acidic catalysation, is somewhat detrimental during the application on acount of a higher requirement of acid and catalyst. In the other properties equivalent condensation products are obtained. Especially when finishing with these products, similarly good finishing effects are obtained as when applying the other described products.

What is claimed is:

1. A process for the manufacture of a curable, textile-finishing condensation product, comprising the sequential steps of
   (a) reacting 2 to 3 moles of urea with 0.9 to 1.1 moles of formaldehyde and 1 mole of isobutyraldehyde, at 50° C to 90° C, in the presence of 0.2 to 1.0 equivalent of strong acid and 4 to 18 moles of water, to give a condensate,
   (b) adjusting the ph to a value in the range of 7 to 9.5 and removing at least part of the water,
   (c) treating the condensate with 3 to 4 moles of formaldehyde to methylolate the condensate and
   (d) etherifying the methylolated condensate with an alcohol of 1 to 3 carbon atoms.

2. The process of claim 1, wherein the formaldehyde in step c) is provided by use of paraformaldehyde.

3. The process of claim 1, wherein 0.35 to 0.65 equivalent of strong acid is used in step a).

4. The process of claim 1, wherein 8 to 16 moles of water is used in step a).

5. The process of claim 3, wherein 8 to 16 moles of water is used in step a).

6. An aqueous composition which is capable of rendering cellulosic textile fibers shrinkproof and crease-resistant, containing an effective amount of a curable, textile finishing condensation product manufactured by a process, comprising the sequential steps of
   (a) reacting 2 to 3 moles of urea with 0.9 to 1.1 moles of formaldehyde and 1 mole of isobutyraldehyde, at 50° C to 90° C, in the presence of 0.2 to 1.0 equivalent of strong acid and 4 to 18 moles of water, to give a condensate,
   (b) adjusting the ph to a value in the range of 7 to 9.5 and removing at least part of the water,
   (c) treating the condensate with 3 to 4 moles of formaldehyde to methylolate the condensate, and
   (d) etherifying the methylolated condensate with an alcohol of 1 to 3 carbon atoms.

7. The aqueous composition of claim 6, wherein the amount of the curable, textile finishing condensation product is in the range of 50 to 85% by weight, calculated as solids.

8. The aqueous composition of claim 6, wherein the amount of the curable, textile-finishing condensation product is in the range of 16.5% to 84.9% by weight, calculated as solids, and wherein the aqueous composition further contains 0.1% to 33.5% by weight, calculated as solids, of a second curable textile-finishing condensation product which is an N-methylol aminoplast compounds, or an ether thereof formed with an alcohol of 1 to 3 carbon atoms, wherein the aminoplast starting compound is selected from the group consisting of urea, ethylene urea, propylene urea, urone, tirazone, dihydroxyethylene urea and melamine, and wherein the aqueous composition contains 50 to 85% by weight of the curable, textile-finishing agents, calculated as solids.

9. The aqueous composition of claim 6, further comprising a water-soluble solvent.

10. The aqueous composition of claim 7, further comprising a water-soluble solvent.

11. The aqueous composition of claim 8, further comprising a water-soluble solvent.

* * * * *

UNITED STATES PATENT AND TRADEMARK OFFICE
CERTIFICATE OF CORRECTION

PATENT NO. : 4,102,840
DATED : JULY 25, 1978
INVENTOR(S) : GUNTER PUSCH

It is certified that error appears in the above-identified patent and that said Letters Patent are hereby corrected as shown below:

In claim 8, column 8, line 45, "tirazone" should read --triazone--.

Signed and Sealed this

Seventeenth Day of November 1981

[SEAL]

Attest:

Attesting Officer

GERALD J. MOSSINGHOFF

Commissioner of Patents and Trademarks